(12) United States Patent
 Zhao et al.

(10) Patent No.: US 11,619,550 B2
(45) Date of Patent: Apr. 4, 2023

(54) FLAME DETECTOR

(71) Applicant: ABB Schweiz AG, Baden (CH)

(72) Inventors: Jianmin Zhao, Beijing (CN); Zhenyue Zhu, Beijing (CN); Lorenzo Galfrascoli, Genoa (IT); Leo Bordignon, Genoa (IT)

(73) Assignee: ABB SCHWEIZ AG, Baden (CH)

( * ) Notice: Subject to any disclaimer, the term of this patent is extended or adjusted under 35 U.S.C. 154(b) by 484 days.

(21) Appl. No.: 16/726,987

(22) Filed: Dec. 26, 2019

(65) Prior Publication Data
 US 2020/0209066 A1 Jul. 2, 2020

(30) Foreign Application Priority Data
 Dec. 26, 2018 (CN) .......................... 201811604683.6

(51) Int. Cl.
 *G01J 5/00* (2022.01)
 *G01J 5/08* (2022.01)
 *G01J 5/0875* (2022.01)

(52) U.S. Cl.
 CPC ........... *G01J 5/0018* (2013.01); *G01J 5/0846* (2013.01); *G01J 5/0875* (2013.01)

(58) Field of Classification Search
 CPC ...... G01J 5/0018; G01J 5/0846; G01J 5/0875; G01J 5/07; G01J 5/0818; G01J 5/06; F23M 11/04
 See application file for complete search history.

(56) References Cited

U.S. PATENT DOCUMENTS

| 3,584,509 | A | | 6/1971 | Compton et al. |
| 3,665,440 | A | * | 5/1972 | McMenamin ......... G08B 17/12 250/372 |
| 4,142,417 | A | | 3/1979 | Cashdollar et al. |

(Continued)

FOREIGN PATENT DOCUMENTS

| CN | 1715843 A | 1/2006 |
| CN | 101144801 A | 3/2008 |

(Continued)

OTHER PUBLICATIONS

Fireye United Technologies, Paragon Flame Scanner, Product Brochure, Apr. 2013, 1 pp.

(Continued)

*Primary Examiner* — David P Porta
*Assistant Examiner* — Gisselle M Gutierrez
(74) *Attorney, Agent, or Firm* — Greenberg Traurig, LLP

(57) ABSTRACT

Embodiments of the present disclosure relate to a flame detector. The flame detector comprises a light guide system including a first end and a second end opposite to the first end, a light path being formed between the first end and the second end and extending along an optical axis; a first hole disposed at the first end, extending along the optical axis and forming a part of the light path, the first hole being configured to receive light emitted by a flame to be detected; and a second hole disposed at the second end, extending along the optical axis and forming a part of the light path, sizes of the first and second holes and a length of the light path being configured such that a detection angle of the light guide system is between 0.5 degrees and 3 degrees.

8 Claims, 2 Drawing Sheets

(56) References Cited

U.S. PATENT DOCUMENTS

| | | | | |
|---|---|---|---|---|
| 4,249,168 | A * | 2/1981 | Muggli | G08B 17/12 |
| | | | | 250/339.05 |
| 4,855,718 | A * | 8/1989 | Cholin | G01J 1/04 |
| | | | | 431/13 |
| 4,882,573 | A * | 11/1989 | Leonard | G08B 17/12 |
| | | | | 340/578 |
| 5,053,754 | A * | 10/1991 | Wong | G08B 17/117 |
| | | | | 73/31.07 |
| 5,120,975 | A * | 6/1992 | Fedor | F23N 5/082 |
| | | | | 250/237 R |
| 8,153,952 | B2 | 4/2012 | Haffner | |
| 9,115,933 | B2 | 8/2015 | Wang et al. | |
| 2010/0110437 | A1* | 5/2010 | Furtaw | G01N 21/3504 |
| | | | | 73/31.04 |
| 2010/0110438 | A1* | 5/2010 | Furtaw | G01N 21/3504 |
| | | | | 356/437 |
| 2012/0120397 | A1* | 5/2012 | Furtaw | G01N 21/3504 |
| | | | | 356/246 |
| 2012/0298867 | A1* | 11/2012 | Nishikawa | G01J 5/0018 |
| | | | | 250/338.3 |
| 2014/0355303 | A1* | 12/2014 | Fujiuchi | H04N 1/0282 |
| | | | | 362/611 |
| 2021/0041350 | A1* | 2/2021 | Takano | G01N 21/53 |
| 2022/0319291 | A1* | 10/2022 | Dittmer | G01J 5/041 |

FOREIGN PATENT DOCUMENTS

| | | |
|---|---|---|
| CN | 101566105 A | 10/2009 |
| CN | 101676964 A | 3/2010 |
| CN | 102520014 A | 6/2012 |
| CN | 202485819 U | 10/2012 |
| CN | 104268938 A | 1/2015 |
| CN | 104407075 A | 3/2015 |
| CN | 107003123 A | 8/2017 |
| DE | 18 06 802 A1 | 6/1969 |
| EP | 2223016 A1 | 9/2010 |
| EP | 3196613 A1 | 7/2017 |
| JP | 2014 095664 A | 5/2014 |

OTHER PUBLICATIONS

Mollman et al., "Two-Color or Ratio Thermal Imaging—Potentials and Limits," FLIR Systems Inc., FLIRTechnical Series, Application Note for Research & Science, 13 pp.

Fireye United Technologies, Type 105F1-1 Integrated Flame Scanner and Temperature Analyzer, Product Brochure, CU-108, Jan. 29, 2018, 28 pp.

European Patent Office, Extended European Search Report issued in corresponding European application No. 19219473.6, dated May 26, 2020, 9 pp.

Office Action issued for CN Application No. 2018116046836 dated Sep. 28, 2021.

Indian Patent Office, Examination Report issued in corresponding Application No. 201944053606, dated Mar. 26, 2021, 7 pp.

China Second Office Action, issued by the National Intellectual Property Administration, regarding corresponding patent application Serial No. CN 201811604683.6; dated Apr. 8, 2022; 13 pages (with English translation).

* cited by examiner

FLAME DETECTOR

FIELD

Embodiments of the present disclosure relate to the field of flame detection, and more specifically to a flame detector.

BACKGROUND

At present, thermal power generation is a mainstream power source in many countries and regions. In thermal power generation, boilers using fossil fuels such as coal are widely used. In such boilers, a flame detector may be used to detect the combustion of the fuel. At the same time, flame detectors are also widely used on occasions such as boilers in the industries such as petrochemical industry. However, current flame detectors lack optical systems suitable for flame temperature measurement.

SUMMARY

Embodiments of the present disclosure provide a flame detector that at least partially addresses the aforementioned drawbacks.

In some embodiments, there is provided a flame detector. The flame detector comprises a light guide system including a first end and a second end opposite to the first end, a light path being formed between the first end and the second end and extending along an optical axis; a first hole disposed at the first end, extending along the optical axis and forming a part of the light path, the first hole being configured to receive light emitted by a flame to be detected; and a second hole disposed at the second end, extending along the optical axis and forming a part of the light path, sizes of the first and second holes and a length of the light path being configured such that a detection angle of the light guide system is between 0.5 degrees and 3 degrees.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter

BRIEF DESCRIPTION OF THE DRAWINGS

Through the following detailed description with reference to the accompanying drawings, the above and other objectives, features, and advantages of example embodiments of the present disclosure will become more apparent. Several example embodiments of the present disclosure will be illustrated by way of example but not limitation in the drawings in which.

DETAILED DESCRIPTION OF EMBODIMENTS

The subject matter described herein will now be discussed with reference to several example implementations. It is to be understood these implementations are discussed only for the purpose of enabling those skilled persons in the art to better understand and thus implement the subject matter described herein, rather than suggesting any limitations on the scope of the subject matter.

As used herein, the term "comprises" and its variants are to be read as open terms that mean "comprises, but is not limited to." The term "based on" is to be read as "based at least in part on." The term "one implementation" and "an implementation" are to be read as "at least one implementation." The term "another implementation" is to be read as "at least one other implementation." The terms "first," "second," and the like may refer to different or same objects. Other definitions, explicit and implicit, may be comprised below. Unless otherwise explicitly specified, definitions of terms are consistent throughout the description.

Figure 1:
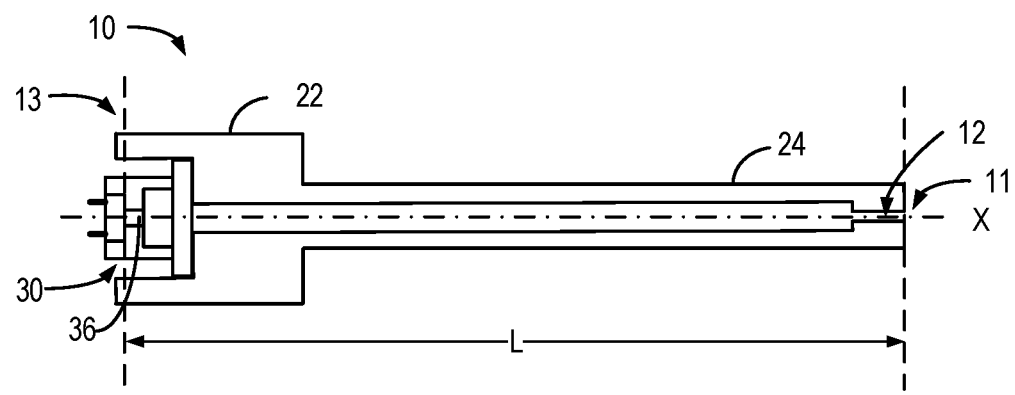
FIG. 1 shows a schematic diagram of an optical system of a flame detector according to an embodiment of the present disclosure.

Hereinafter, a flame detector according to an example embodiment of the present disclosure will be described in detail with reference to FIGS. 1-4, in which FIG. 1 shows a sectional view of an optical system of a flame detector 10 according to an example embodiment of the present disclosure. It should be appreciated that the flame detector 10 may include one or more additional components not shown, and the present disclosure is not limited herein. For example, the flame detector 10 may detect at least one of a flicker frequency and brightness of a flame, and include a corresponding detection device (not shown).

As shown in FIG. 1, the flame detector 10 includes a light guide system, which may also be referred to as a telescope, which includes a first end 11 and a second end 13. A light path extending along an optical axis X is formed between the first end 11 and the second end 13 and has a length L. For example, the length L of the light path may be between 50 mm and 500 mm. 12 is provided at the first end 11, and the hole 12 extends along the optical axis X and receives light emitted by a flame to be detected. As shown in FIG. 1, the hole 12 forms a part of the light path. For example, the hole 12 may have a circular cross section. Alternatively, the hole 12 may also have a cross section of another suitable shape. For the sake of convenience, the hole 12 is also referred to as the first hole 12. The first hole 12 may have various sizes, depending on specific situations, for example, an illuminated area of the sensor, an effective area of the sensor, and/or a detection angle of the light guide system. For example, the size of the hole 12 may be in a range between 0.5 mm and 10 mm, for example, 2 mm, 2.5 mm, or 3 mm.

In addition, the light guide system is provided with a second hole 36 at a second end 13 extending along the optical axis X. As shown in FIG. 1, the second hole 36 forms a part of the light path. For example, the second hole 36 may have a circular cross section. Alternatively, the holes 36 may have a cross section of another suitable shape. In some embodiments, the flame detector 10 is provided at the second end 13 with a temperature sensor 38 which determines the temperature of the flame based on the light received from the second hole 36. The second hole 36 may have various sizes, depending on specific circumstances, for example, an illuminated area of the sensor and/or an effective area of the sensor. For example, the size of the second hole 36 may be in a range between 0.5 mm and 5 mm. The second hole 36 may further select light substantially parallel to the optical axis X to enter the sensor.

According to an embodiment of the present disclosure, the length L of the light path and the size D1 of the first hole 12 and the size D2 of the second hole 36 are configured such that a detection angle Theta of the light guide system is located within a predetermined angle range, for example, in the range of 0.5° to 3°, for example, about 1°. The relationship between the detection angle Theta and the length L of the light path and the size D1 of the first hole 12 and the size D2 of the second hole 36 can be denoted by the following equation: tan(Theta/2)=(D1+D2)/2L. The range of the detection angle of the light guide system may be conveniently selected by configuring the length L of the light path and the size D1 of the first hole 12 and the size D2 of the second hole 36.

With the light guide system as described above, light with a large divergence angle is lost through multiple emissions of the side wall of the light path, so that it cannot be emitted out of the second hole 36. In this way, light of a certain detection angle may be selected, so that the sensor assembly 30 provided at the second end 13 will not be saturated due to excessive light intensity. In addition, the light incident on the sensor assembly 30 is substantially parallel to the optical axis X, thereby simplifying the design of the sensor assembly 30.

Figure 2:
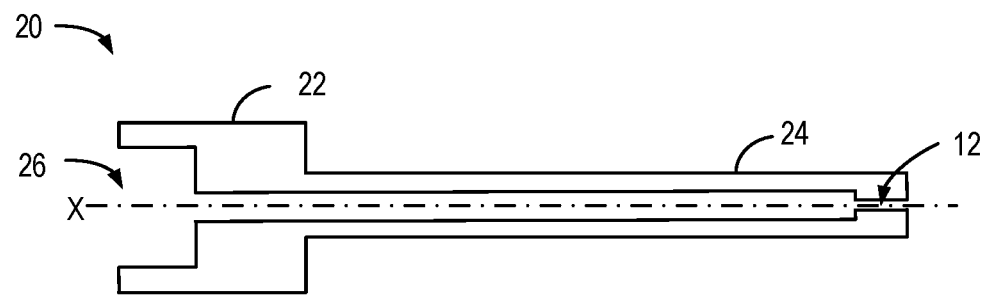
FIG. 2 shows a schematic diagram of a body of an optical system of a flame detector according to an embodiment of the present disclosure.

FIG. 2 illustrates a cross-sectional view of a body 20 of a light guide system of a flame detector 10 according to an example embodiment of the present disclosure. The body 20 may be made of a metal, for example, aluminum or stainless steel. As shown in FIGS. 1 and 2, the body 20 further includes a pipe 24 extending between the first end 11 and the sensor assembly 30 along the optical axis X and constituting at least a portion of the light path. The pipe 24 is configured to receive light entering the flame detector 10 via the first hole 12. The body 20 may further include a connector 22 having an opening 26 for receiving the sensor assembly 30 and forming a part of the light path, and the connector 22 is configured to transmit light received from the pipe 24 to a temperature sensor 38. For example, the connector 22 and the pipe 24 may be formed integrally, or connected together by a mechanism such as a thread.

Figure 3:
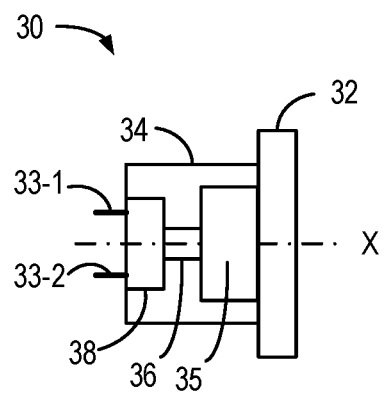
FIG. 3 shows a schematic diagram of a sensor assembly of a flame detector according to an embodiment of the present disclosure.

The sensor assembly 30 may include the above-mentioned temperature sensor 38, which is disposed at the second end 13 and configured to determine the temperature of the flame based on the light received from the light path. For greater clarity, FIG. 3 shows a schematic diagram of the sensor assembly 30 according to an embodiment of the present disclosure. As shown in FIGS. 1 and 3, the sensor assembly 30 includes a light-transmissive window 32 that is disposed between the second hole 36 and the second end 13. The light-transmissive window 32 is configured to transmit light emitted from the second end 13 to a light-receiving plane of the second hole 36 perpendicular to the optical axis X. The light transmissive window 32 may transmit light over a wide range of wavelengths (e.g., 300-1100 nm) substantially uniformly.

The sensor assembly 30 further includes a support member 34 for supporting components such as the light-transmissive window 32. The support member 34 includes an opening 35 and the second hole 36 and carries the temperature sensor 38. The temperature sensor 38 has leads 33-1 and 33-2. However, it should be understood that the temperature sensor 38 may also include more leads, such as three leads.

A detection circuit (not shown) may be coupled to the temperature sensor 38 through the leads 33-1 and 33-2 to receive a temperature measurement signal. The detection circuit may include an analog circuit portion for amplifying a detection signal, such as a current signal, received from the temperature sensor 38. The detection circuit may further include a digital circuit portion for processing the amplified detection signal.

Figure 4:
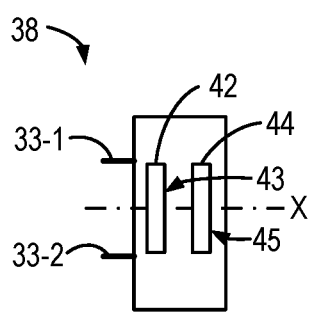
FIG. 4 shows a schematic diagram of a sensor of a flame detector according to an embodiment of the present disclosure.

In some embodiments, the temperature sensor 38 may be a two-color optical sensor. The two-color optical sensor determines the temperature of the flame to be measured by comparing the light intensities over two different wavelength ranges and based on a ratio of the two light intensities. For example, the digital circuit portion may perform the above calculation and processing. FIG. 4 shows a schematic diagram of a temperature sensor 38 according to some embodiments of the present disclosure. As shown in FIG. 4, the two-color optical sensor includes a first optical sensor 42 for detecting light in a first wavelength range. The second optical sensor 44 is stacked on the first optical sensor 42 and configured to detect light in a second wavelength range, which is different from the first wavelength range.

As shown in FIG. 4, the first optical sensor 42 includes a first light-sensitive surface 43 and the second optical sensor 44 includes a second light-sensitive surface 45. Both the first light-sensitive surface 43 and the second light-sensitive surface 45 are perpendicular to the optical axis X. In some embodiments, the size of the first light-sensitive surface 43 and the second light-sensitive surface 45 may be set so that light emitted from the second hole 36 can reach the first light-sensitive surface 43 and the second light-sensitive surface 45. For example, the size of the first light-sensitive surface 43 and the second light-sensitive surface 45 is larger than a diameter of the second hole 36. In addition, the first light-sensitive surface 43 and the second light-sensitive surface 45 may have the same size, and may be positioned to completely overlap when viewed in the optical axis X direction.

The flame detector 10 may make the light substantially parallel to the optical axis X to be incident on the two-color optical sensor. Therefore, the light incident on the second optical sensor 44 in the two-color optical sensor may also substantially be incident on the first optical sensor 42 of the two-color optical sensor. In this way, it may be ensured that the two-color optical sensor can accurately measure the temperature of the flame.

What are described above are only optional embodiments of the present disclosure, which are not intended to limit the present disclosure. Those skilled in the art appreciate that the present disclosure may have various modifications and variations. Any modification, equivalent replacement, and improvement made within the spirit and principle of the present disclosure shall be included in the protection scope of the present disclosure.

Although the claims in the present application have been formulated for specific combinations of features, it should be understood that the scope of the present disclosure herein also includes any novel feature or any novel combination of features disclosed either explicitly or implicitly or any generalization or modification thereof, whether or not such relates to the same invention as presently claimed in any claim.

We claim:

1. A flame detector, comprising:
  a light guide system having a body and including a first end and a second end opposite to the first end, a light path being formed between the first end and the second end and extending along an optical axis;
  a support member disposed at the second end of the light guide system;
  a first hole having a first size disposed at the first end of the body, the first hole configured to extend along the optical axis and form a part of the light path, and the first hole being configured to receive light emitted by a flame to be detected;
  a second hole having a second size disposed at the support member at the second end, the second hole configured to extend along the optical axis and forming a part of the light path, wherein the sizes of the first and second holes and a length of the light path being configured such that a detection angle of the light guide system is between 0.5 degrees and 3 degrees; and a temperature sensor disposed at the second end and configured to determine a temperature of the flame based on light received from the second hole.

2. The flame detector of claim 1, wherein the light guide system comprises:

a light transmissive window disposed between the second hole and the body and configured to transmit light emitted out of the body to a light receiving plane of the second hole along the optical axis.

3. The flame detector of claim 2, wherein the body comprises:

a pipe configured to extend between the first hole and the light transmissive window along the optical axis and form at least a part of the light path, the pipe being configured to receive light entering the flame detector via the first hole.

4. The flame detector of claim 3, wherein the body further comprises:

a connector comprising an opening configured to receive the light transmissive window and forming a part of the light path, the connector being configured to transfer light received from the pipe to the light transmissive window.

5. The flame detector of claim 1, wherein the temperature sensor comprises a two-color optical sensor.

6. The flame detector of claim 5, wherein the two-color optical sensor comprises:

a first optical sensor configured to detect light in a first wavelength range; and a second optical sensor stacked on the first optical sensor and configured to detect light in a second wavelength range different from the first wavelength range.

7. The flame detector of claim 6, wherein the first optical sensor comprises a first light-sensitive surface, the second optical sensor comprises a second light-sensitive surface, and the first light-sensitive surface and the second light-sensitive surface are perpendicular to the optical axis.

8. The flame detector of claim 1, wherein the flame detector is configured to detect at least one of a flicker frequency and a brightness of the flame.

* * * * *